(12) United States Patent
Overend et al.

(10) Patent No.: US 7,700,263 B2
(45) Date of Patent: Apr. 20, 2010

(54) SUBSTANTIALLY SOLVENT-FREE AND PHOTOINITIATOR-FREE CURABLE INK

(75) Inventors: Andrew Stuart Overend, Manchester (GB); Janette Cordwell, Manchester (GB); Matthew Lloyd Parry, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 556 days.

(21) Appl. No.: 10/583,709

(22) PCT Filed: Dec. 2, 2004

(86) PCT No.: PCT/GB2004/005050

§ 371 (c)(1),
(2), (4) Date: Apr. 6, 2007

(87) PCT Pub. No.: WO2005/061634

PCT Pub. Date: Jul. 7, 2005

(65) Prior Publication Data

US 2007/0281245 A1      Dec. 6, 2007

(30) Foreign Application Priority Data

Dec. 20, 2003   (GB) ................................ 0329597.9

(51) Int. Cl.
C09D 11/00 (2006.01)
C09D 11/10 (2006.01)
(52) U.S. Cl. ................. 430/281.1; 522/71; 347/96; 347/100; 101/491; 106/31.6
(58) Field of Classification Search .................. None
See application file for complete search history.

(56) References Cited

U.S. PATENT DOCUMENTS

| | | | |
|---|---|---|---|
| 4,303,924 A | 12/1981 | Young, Jr. ................. 346/1.1 |
| 5,275,646 A | 1/1994 | Marshall et al. ........... 106/20 B |
| 5,629,359 A | 5/1997 | Peeters et al. ............... 522/96 |
| 5,881,194 A | 3/1999 | Duecker .................... 385/115 |
| 5,981,113 A | 11/1999 | Christian .................... 430/9 |
| 6,114,406 A | 9/2000 | Caiger et al. ............... 522/121 |
| 6,232,359 B1 | 5/2001 | Christian ................... 522/18 |
| 6,550,905 B1 | 4/2003 | Deckers | |
| 6,586,492 B1 * | 7/2003 | Caiger et al. ............... 522/75 |
| 6,593,390 B1 | 7/2003 | Johnson et al. | |
| 2003/0199655 A1 | 10/2003 | Yurugi et al. | |
| 2004/0010052 A1 * | 1/2004 | Ishizuka et al. ............ 522/75 |

FOREIGN PATENT DOCUMENTS

| | | |
|---|---|---|
| EP | 0 540 203 A1 | 5/1993 |
| EP | 0 555 069 A1 | 8/1993 |
| EP | 1 323 795 A1 | 7/2003 |
| JP | 2002-179967 | 6/2002 |
| WO | WO 99/29787 | 6/1999 |
| WO | WO 99/29788 A | 6/1999 |
| WO | WO 00/31189 | 6/2000 |
| WO | WO 02/38688 | 5/2002 |
| WO | WO 02/46323 | 6/2002 |
| WO | WO 2004/026978 | 4/2004 |

* cited by examiner

*Primary Examiner*—David Wu
*Assistant Examiner*—Vu Nguyen
(74) *Attorney, Agent, or Firm*—Morgan Lewis & Bockius LLP

(57) ABSTRACT

A non-aqueous, substantially solvent-free and photoinitiator-free, particle beam curable ink having a viscosity less than 30 m Pa·s at 60° C., comprising:
  (i) a colorant; and
  (ii) a mixture of (meth)acrylate compounds;
wherein:
  (a) the colorant is present in the ink in an amount of 0.1 to 14.9% by weight relative to the total weight of ink; and
  (b) the mixture of (meth)acrylate compounds comprises c % of one or more mono (meth)acrylate compounds, d % of one or more di (meth)acrylate compounds and e % of one or more compounds having three or more (meth)acrylate groups, wherein the values of c %, d % and e % are by weight relative to the total weight of the mono (meth)acrylate compounds, di (meth)acrylate compounds and compounds having three or more (meth)acrylate groups and are such that the value of Formula (1) is less than or equal to 60:

$$c\ \% + 0.628\left(\frac{d\ \%}{\sin 60} + \frac{e\ \%}{\tan 60}\right) \quad \text{Formula (1)}$$

Said inks are especially useful as ink jet printing inks. The inks are especially suitable for food contact applications and when printed and cured demonstrate good fat resistance and low levels of leaching to foodstuffs.

14 Claims, No Drawings

SUBSTANTIALLY SOLVENT-FREE AND PHOTOINITIATOR-FREE CURABLE INK

This is a 371 of PCT/GB04/05050, filed Dec. 2, 2004 and claiming priority from UK Application No. 0329597.9, filed Dec. 20, 2003.

This invention relates to particle beam curable inks and to their use in ink jet printing. The inks are especially useful in food contact applications.

Ink jet printing is a non-contact printing method by which droplets of ink are ejected through a fine nozzle onto a substrate. There are many demanding performance requirements for inks used in ink jet printing.

In particular, ink jet printing inks must have a carefully controlled viscosity, surface tension, good storage stability and good printer operability. The printed image should be sharp, non-feathered and readily/rapidly curable by means of particle beams and especially electron beams. For food contact applications the printed image after having been cured should exhibit good resistance to fat and to fat/water mixtures. The cured image should also exhibit low levels of leaching of any compounds within the cured image into any nearby foodstuff. The fat and water resistance can be seen in reduced physical damage to the cured printed image. The demands of good fat/water resistance and low leachability combined with good printer operability are difficult to simultaneously achieve because the measures taken to improve said resistances tend to impair or reduce printer operability or increase the amounts of leachable materials remaining in the cured ink.

Ink jet inks are known which comprise photo-initiators and which are curable by exposure to UV light. Examples of such known UV curable inks, when cured, may exhibit good solvent resistance but this is at the expense of reduced printer operability and/or increased levels of leachable components. Known inks having good solvent resistances tend also to have undesirably high viscosities.

Often organic solvents are included in radiation curable ink jet printing inks to lower their viscosity. However such solvents can give rise to undesirable odours, particularly in the home and small, poorly ventilated offices. Inclusion of low boiling point organic solvents should be avoided in order to minimise the release of volatile organic solvents into the atmosphere. Inclusion of high boiling point solvents can increase ink dry times significantly which tends to slow print speeds.

U.S. Pat. No. 5,270,368 discloses UV-curable etch-resistant compositions for ink jet printing containing large amounts of organic solvents such as methanol to achieve a sufficiently low viscosity for jetting.

U.S. Pat. No. 4,303,924 discloses radiation curable ink jet printing inks containing organic solvent.

WO 02/38688 discloses radiation curable compositions having good outdoor weather resistance.

Known ink jet printing inks have not simultaneously provided a substantially solvent-free, particle beam curable ink having good operability in an ink jet printer wherein the ink when cured demonstrates low leaching and good fat resistance.

According to the first aspect of the present invention there is provided a non-aqueous, substantially solvent-free and photoinitiator-free, particle beam curable ink having a viscosity less than 30 mPa·s at 60° C., comprising:
(i) a colorant; and
(ii) a mixture of (meth)acrylate compounds;
wherein:

(a) the colorant is present in the ink in an amount of 0.1 to 14.9% by weight relative to the total weight of ink; and
(b) the mixture of (meth)acrylate compounds comprises c % of one or more mono (meth)acrylate compounds, d % of one or more di (meth)acrylate compounds and e % of one or more compounds having three or more (meth) acrylate groups, wherein the values of c %, d % and e % are by weight relative to the total weight of the mono (meth)acrylate compounds, di (meth)acrylate compounds and compounds having three or more (meth) acrylate groups and are such that the value of Formula (1) is less than or equal to 60:

$$c\% + 0.628\left(\frac{d\%}{\sin 60} + \frac{e\%}{\tan 60}\right) \quad \text{Formula (1)}$$

$$c\% + 0.628\left(\frac{d\%}{\sin 60°} + \frac{e\%}{\tan 60°}\right)$$

None of the aforementioned prior art documents (namely U.S. Pat. No. 5,270,368, U.S. Pat. No. 4,303,924 and WO 02/38688) disclose any ink within Formula (1). It is thought that the mixtures of (meth)acrylate compounds encompassed by Formula (1) are particularly important in providing the advantages of the present invention.

In one embodiment the value of Formula (1) is preferably from 40 to 60, more preferably from 42.6 to 57, especially from 49 to 55.8. Such values provide especially good ink jet printer operability.

In a second embodiment the value of Formula (1) is preferably from 10 to 55, more preferably from 10 to 50 and especially from 30 to 50. Such values provide especially good fat resistance.

The amount of colorant in the ink is preferably from 0.1 to 14%, more preferably from 1 to 10% and especially from 1.1 to 8% by weight, relative to the total weight of the ink. Preferably the colorant is not white. Preferred colorants are yellow, magenta, cyan, black, blue, indigo, violet, green, orange, red and mixtures comprising two or more thereof. Preferably the ink is free from titanium dioxide.

The colorant is preferably a dye, a pigment or a mixture thereof. Preferred dyes and pigments are free from ionic groups, for example disperse dyes and water-insoluble pigments are especially preferred colorants.

More preferably the colorant is a pigment. Preferred pigments are organic or inorganic. The pigment is preferably in the form particles which are small enough to pass through the very fine nozzles used in the printheads of ink jet printers. Typically these nozzles are half the diameter of a human hair. Thus the average particle size of the pigment is preferably from 0.003 to 15 μm, more preferably from 0.004 to 5 μm and especially from 0.005 to 1 μm. By choosing particles of this size advantages can be achieved in terms of storage stability for the ink and high optical density for the resultant prints. Pigment particle sizes outside these ranges may be used where printheads have particularly large nozzle diameters. Very fine dispersions of pigments and methods for their preparation are disclosed in, for example, EP 0 776 952, U.S. Pat. No. 5,538,548, U.S. Pat. No. 5,443,628, EP 0 259 130, U.S. Pat. No. 5,285,064, EP 0 429 828 and EP 0 526 198.

Examples of inorganic pigments include carbon black, titania, iron oxide, zinc oxide and mixtures thereof. Examples of organic pigments include phthalocyanines, anthraquinones, perylenes, carbazole, monoazo and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazo acrylides, anthrapyrimidines and mixtures thereof.

Examples of carbon black pigments include Regal 400R, Mogul™ L, Elftex™ 320 from Cabot Co., or Carbon Black FW18, Special Black 250, Special Black 350, Special Black 550, Printex™ 25, Printex™ 35, Printex™ 55 and Printex™ 150T from Degussa Co., and Pigment Black 7.

Further examples of pigments include C.I. Pigment Yellow 17, C.I. Pigment Blue 27. C.I. Pigment Red 49:2, C.I. Pigment Red 81:1, C.I. Pigment Red 81:3, C.I. Pigment Red 81:x, C.I. Pigment Yellow 83, C.I. Pigment Red 57:1, C.I. Pigment Red 49:1, C.I. Pigment Violet 23, C.I. Pigment Green 7, C.I. Pigment Blue 61, C.I. Pigment Red 48:1, C.I. Pigment Red 52:1, C.I. Pigment Violet 1, C.I. Pigment White 6, C.I. Pigment Blue 15, C.I. Pigment Yellow 12, C.I. Pigment Blue 56, C.I. Pigment Orange 5, C.I. Pigment Black 7, C.I. Pigment Yellow 14, C.I. Pigment Red 48:2, C.I. Pigment Blue 15:3, C.I. Pigment Yellow 1, C.I. Pigment Yellow 3, C.I. Pigment Yellow 13, C.I. Pigment Orange 16, C.I. Pigment Yellow 55, C.I. Pigment Red 41, C.I. Pigment Orange 34, C.I. Pigment Blue 62, C.I. Pigment Red 22, C.I. Pigment Red 170, C.I. Pigment Red 88, C.I. Pigment Yellow 151, C.I. Pigment Red 184, C.I. Pigment Blue 1:2, C.I. Pigment Red 3, C.I. Pigment Blue 15:1, C.I. Pigment Blue 15:3, C.I. Pigment Blue 15:4, C.I. Pigment Red 23, C.I. Pigment Red 112, C.I. Pigment Yellow 126, C.I. Pigment Red 169, C.I. Pigment Orange 13, C.I. Pigment Red 1-10, 12, C.I. Pigment Blue 1:X, C.I. Pigment Yellow 42, C.I. Pigment Red 101, C.I. Pigment Brown 6, C.I. Pigment Brown 7, C.I. Pigment Brown 7:X, C.I. Pigment Black 11, C.I. Pigment Metal 1, C.I. Pigment Metal 2, C.I. Pigment Yellow 128, C.I. Pigment Yellow 93, C.I. Pigment Yellow 74, C.I. Pigment Yellow 138, C.I. Pigment Yellow 139, C.I. Pigment Yellow 154, C.I. Pigment Yellow 185, C.I. Pigment Yellow 180, C.I. Pigment Red 122, C.I. Pigment Red 184, and bridged aluminium phthalocyanine pigments.

Further pigments are listed in *The Colour Index* and updates thereof, especially the $3^{rd}$ edition, 1982, pages 6-146.

The especially preferred pigments are Pigment Yellow 128, 93, 17, 74, 138, 139, 154, 185, 180; Pigment Red 122, 57:1, 184; Pigment Blue 15:3, 15:4 and carbon black.

Preferred dyes include azo, diazo, xanthene, anthraquinone, triaryl methane, azine, thiazine, phthalocyanine and nigrosine types. Dyes may be used singly or in combination with other dyes and/or pigments. Dyes are preferably disperse or solvent soluble, examples of which may be selected from *The Colour Index* especially the $3^{rd}$ edition, 1982, pages 147-263. Dyes can be metalised or non-metalised. Where a dye is present the dye preferably comprises one or more (meth) acrylate groups such that when the ink is printed and then cured the dye is substantially non-leachable from the ink.

The ink optionally further contains a dispersant. When the colorant is a disperse dye a dispersant is often not necessary because the dye may be soluble in the formulation. Similarly when the pigment is self-dispersible (e.g. the pigment carries dispersing groups or is surface modified to be self-dispersible) no further dispersant is needed. However when the colorant is insoluble in the mixture of (meth)acrylate compounds (component (ii)) a dispersant is preferably included in the ink to assist storage stability. Suitable dispersants include, for example, polyester, polyurethane and polyacrylate dispersants, especially those in the form of high molecular weight block copolymer. Examples of dispersants include Disperbyk™ (ex BYK Chemie) and especially Solsperse™ (ex Lubrizol) dispersants. A detailed list of non-polymeric as well as some polymeric dispersants appears in, for example, *McCutcheon's Functional Materials*, North American Edition, Manufacturing Confectioner Publishing Co., Glen Rock, N.J., pp. 110-129 (1990), the entire disclosure of which is incorporated herein by reference. Dispersants suitable for use with pigments are also disclosed in U.S. Pat. No. 4,398,955, U.S. Pat. No. 4,861,380, U.S. Pat. No. 5,700,395, U.S. Pat. No. 6,197,877, WO 99/49963 and WO 99/55763. When the ink contains a dispersant this is preferably present in an amount of 50 to 150% by weight relative to the weight of colorant.

Where a dispersant is present in the ink the dispersant preferably comprises one or more (meth) acrylate groups such that when the ink is printed and then cured the dispersant is substantially non-leachable from the ink.

The pigment and dispersant are preferably added to the ink as a mixture. For example, a mixture of a pigment and a dispersant may be made by milling pigment in a small amount of the (meth)acrylate components c), d) and e) with a milling media, e.g. glass beads. The pigment dispersion is then typically screened and "let down" by slowly adding the remaining ink components.

Inks of the present invention must be substantially free from any photoinitiator. By the term substantially, with reference to photoinitiator, it is meant that no more than 0.1% by weight of photoinitiator is present in the ink. More preferably the ink is completely free of any photo-initiator. The particle beam may be any particle beam known to those skilled in the art for effecting the cure of (meth)acrylate compounds. Examples of particle beams include proton, alpha-particle and especially electron beams. Preferably the ink is curable by exposure to an electron beam.

It will be understood that the mixture of (meth)acrylate compounds must comprise at least one mono(meth)acrylate, at least one di(meth)acrylate and at least one tri(meth)acrylate compound. Thus none of the percentages represented by c %, d % or e % can be zero. Preferably each of the percentages represented by c %, d % and e % are at least 0.1%, and more preferably at least 1%. Mono (meth)acrylate compounds have one (and only one) acrylate or methacrylate group. (Meth) acrylate groups are represented by the formula:

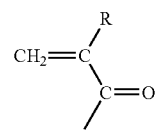

wherein R is H or methyl

The mono (meth)acrylate compound is preferably a monomer. Examples of mono (meth)acrylate monomers include cyclic trimethylolpropane formal (meth)acrylate, ethoxylated tetra hydrofurfuryl (meth)acrylate, phenoxy ethyl (meth)acrylate, trimethylol propane formal (meth)acrylate, lauryl (meth)acrylate, stearyl (meth)acrylate, monomethoxy neopentyl glycol propoxylate mono (meth)acrylate, monomethoxy tripropylene glycol mono (meth)acrylate, 2-(2-ethoxyethoxy) ethyl (meth)acrylate, iso-decyl (meth) acrylate, iso-octyl (meth)acrylate, iso-nonyl (meth)acrylate, tridecyl (meth)acrylate, iso-bornyl (meth)acrylate, ethoxyl nonyl phenol (meth)acrylate, ethoxylated phenol (meth)acrylate, 2-hydroxyl ethyl (meth) acrylate, 4-hydroxyl butyl (meth) acrylate, 2-hydroxy propyl (meth) acrylate, iso-butyl (meth) acrylate, tert-butyl (meth) acrylate, cetyl (meth)acrylate, cyclohexyl (meth)acrylate, ethyl hexyl (meth)acrylate, 2-dimethyl amino ethyl (meth) acrylate, trifluoro ethyl (meth) acrylate, 3-methoxy butyl (meth)acrylate, dicyclopentenyl (meth)acrylate, polyethylene glycol mono (meth)acrylate and poly propylene glycol mono (meth)acrylate. Preferred mono (meth)acrylate monomers include lauryl (meth)acrylate, tetrahydro furfuryl (meth)acrylate, 2-(2-ethoxyethoxy) ethyl (meth)acrylate, iso-octyl (meth)acrylate, iso-decyl (meth)acrylate, tridecyl (meth)acrylate, dodecyl (meth)acrylate, isobornyl (meth)acrylate, cyclic trimethylol propane formal (meth)acrylate.

It is especially preferred that the one or more monomer (meth)acrylate compounds is or comprises isobornyl acrylate.

It is preferred that c % is at least 5%, more preferably at least 10% and especially at least 20%. It is preferred that c % at most 35% and more preferably at most 25%. Such compositions have improved operability in ink jet printing.

Di(meth)acrylate compounds have two (and only two) groups selected from acrylate and methacrylate groups.

Preferred di (meth)acrylate compounds are di (meth)acrylate monomers, for example di(meth)acrylates of 1,4 butane diol, 1-6 hexane diol, neopentyl glycol, mono, di, tri and poly ethylene glycols, mono, di, tri and poly propylene glycols, mono methoxy ethoxylated trimethylolpropane, propoxylated neopentyl glycol, ethoxylated neopentyl glycol, 1,2 butylene glycol and ethoxylated hexane diol.

It is especially preferred that the one or more di(meth) acrylate compounds is or comprises 1,6 hexane diol diacrylate.

It is preferred that both the mono (meth)acrylate compounds and di(meth)acrylate compounds are monomers. Preferably, the mono (meth)acrylate and di(meth)acrylate compounds each separately have a molecular weight of less than 1,000.

The compound(s) having three or more (meth) acrylate groups have three or more groups selected from acrylate and methacrylate. The compound having three or more (meth) acrylate groups is preferably a monomer, oligomer or polymer, preferred examples of which include trimethylol propane tri(meth)acrylate, ethoxylated trimethylol propane tri (meth)acrylate, propoxylated trimethylol propane tri(meth) acrylate, glycerol tri(meth)acrylate, propoxylated glycerol tri(meth)acrylate, pentaerythritol tri(meth)acrylate, pentaerythritol tetra(meth)acrylate, tris (2-hydroxyethyl) isocyanurate triacrylate, ditrimethylol propane tetra (meth)acrylate, ethoxylated pentaerythritol tetra(meth)acrylate, ethoxylated di-pentaerylthritol tetra (meth)acrylate, tetra methylol methane tetra (meth)acrylate, multifunctional (meth)acrylate-urethanes, (meth)acrylate-polyesters and (meth)acrylate acrylics.

It is especially preferred that the one or more compounds comprising three or more (meth)acrylate groups is or comprises trimethylol propane triacrylate and/or ethoxylated trimethylol propane triacrylate.

It is especially preferred that the one or more compounds comprising three or more (meth)acrylate groups has a molecular weight of less than 5,000 and especially less than 1,000.

Inks which contain acrylates polymerise more quickly than those containing methacrylates when exposed to particle beam radiation. Consequently, the amount of methacrylate groups is preferably not greater than 20%, more preferably not greater than 10% and especially not greater than 5% based on the total number of moles of both acrylate and methacrylate groups present in component (ii). It is particularly preferred that component (ii) contains no methacrylate groups.

Optionally the ink further comprises a polymer or oligomer containing no (meth)acrylate groups. Preferably the polymer and oligomer containing no (meth)acrylate groups is present in the ink at from 0 to 15%, more preferably from 0 to 10% and most preferably from 0 to 5% by weight relative to the total weight of the ink.

Inks of the present invention are substantially solvent free. That is to say no solvent or water is present in the ink except for trace amounts which may be present as impurities in any of the ink components. Preferably any such impurities are less than 2%, more preferably less than 0.5% and especially less than 0.01% by weight relative to the total weight of ink. As hereinbefore described inks of the present invention are particularly suitable for use in ink jet printing. Thus, according to a second aspect of the present invention, there is provided the use of the ink according to first aspect of the present invention as an ink jet printing ink. A preferred type of ink jet printing for inks of the present invention is piezo ink jet printing.

The viscosity of the inks of the present invention are preferably 1 to 30 mPa·s, more preferably from 2 to 25 mPa·s at 60° C. The ink composition may optionally have a higher viscosity at room temperature provided that the final ink meets the above viscosity requirements at the above temperature.

The surface tension of the ink of the present invention is preferably below 40 dynes/cm.

Inks of the present invention are preferably free from particulate impurities that would tend to block an ink jet nozzle. To achieve this the ink is preferably filtered through a filter with a pore size of less than 10 μm, more preferably less than 3 μm and especially less than 1 μm.

A particularly preferred ink according to the invention is a non-aqueous, substantially solvent-free and photoinitiator-free, particle beam curable ink having a viscosity of 1 to 30 mPa·s at 60° C. comprising:
  (i) a yellow, magenta, cyan, black, blue, indigo, violet, green, orange or red pigment or a mixture comprising two or more thereof; and
  (ii) a mixture of (meth)acrylate compounds;
  wherein:
  (a) the pigment is present in the ink an amount of from 1.1 to 8% by weight relative to the total weight of ink;
  (b) the mixture of (meth)acrylate compounds comprises c % of one or more mono (meth)acrylate compounds, d % of one or more di (meth)acrylate compounds and e % of one or more compounds having three or more (meth) acrylate groups, wherein the values of c %, d % and e % are by weight relative to the total weight of the mono (meth)acrylate compounds, di (meth)acrylate compounds and compounds having three or more (meth) acrylate groups and are such that the value of Formula (1) is from 40 to 60:

$$c\% + 0.628\left(\frac{d\%}{\sin 60} + \frac{e\%}{\tan 60}\right) \quad \text{Formula (1)}$$

$$c\% + 0.628\left(\frac{d\%}{\sin 60°} + \frac{e\%}{\tan 60°}\right)$$

(c) the one or more mono (meth)acrylate compounds are selected from the group consisting of cyclic trimethylolpropane formal (meth)acrylate, ethoxylated tetra hydrofurfuryl (meth)acrylate, phenoxy ethyl (meth)acrylate, trimethylol propane formal (meth)acrylate, lauryl (meth)acrylate, stearyl (meth)acrylate, monomethoxy neopentyl glycol propoxylate mono (meth)acrylate, monomethoxy tripropylene glycol mono (meth)acrylate, 2-(2-ethoxyethoxy) ethyl (meth)acrylate, iso-decyl (meth)acrylate, iso-octyl (meth)acrylate, iso-nonyl (meth)acrylate, tridecyl (meth)acrylate, iso-bornyl (meth)acrylate, ethoxyl nonyl phenol (meth)acrylate, ethoxylated phenol (meth)acrylate, 2-hydroxyl ethyl (meth) acrylate, 4-hydroxyl butyl (meth) acrylate, 2-hydroxy propyl (meth) acrylate, iso-butyl (meth) acrylate, tert-butyl (meth) acrylate, cetyl (meth)acrylate, cyclohexyl (meth)acrylate, ethyl hexyl (meth)acrylate, 2-dimethyl amino ethyl (meth) acrylate, trifluoro ethyl (meth)acrylate, 3-methoxy butyl (meth)acrylate, dicyclopentenyl (meth)acrylate, polyethylene glycol mono (meth)acrylate and poly propylene glycol mono (meth) acrylate and mixtures thereof;

(d) the one or more di (meth)acrylate compounds are selected from the group consisting of di(meth)acrylates of 1,4 butane diol, 1-6 hexane diol, neopentyl glycol, mono, di, tri and poly ethylene glycols, mono, di, tri and poly propylene glycols, mono methoxy ethoxylated trimethylolpropane, propoxylated neopentyl glycol, ethoxylated neopentyl glycol, 1,2 butylene glycol and ethoxylated hexane diol and mixtures thereof; and (e) the one or more compounds having three or more (meth)acrylate groups are selected from the group consisting of trimethylol propane tri(meth)acrylate, ethoxylated trimethylol propane tri(meth)acrylate, propoxylated trimethylol propane tri(meth)acrylate, glycerol tri (meth)acrylate, propoxylated glycerol tri(meth) acrylate, pentaerythritol tri(meth)acrylate, pentaerythritol tetra(meth)acrylate, tris (2-hydroxyethyl) isocyanurate triacrylate, ditrimethylol propane tetra (meth)acrylate, ethoxylated pentaerythritol tetra (meth)acrylate, ethoxylated di-pentaerylthritol tetra (meth)acrylate, tetra methylol methane tetra (meth) acrylate, multifunctional (meth)acrylate-urethanes, (meth)acrylate-polyesters and (meth)acrylate acrylics and mixtures thereof.

In this preferred ink the mixture of (meth)acrylate compounds is preferably present in the ink in an amount of from 70 to 95.9%, more preferably from 75 to 95.9%, and especially from 78 to 95.9% by weight relative to the total weight of ink. Any difference between the weight of components (i) and (ii) and 100% is made up by other customary ink additives, e.g. flow control agents, dispersants, biocides, rheology modifiers and so on other than water or organic solvent.

Inks of the present invention may contain further components in addition to components (i) and (ii) specified above, for example preservatives, biocides, rheology modifiers, surfactants, levelling agents, antifoaming agents, anti-kogation agents and combinations thereof. It is preferred that such additives are not present in the ink in order to minimise any components which might be leachable on food contact.

According to a third aspect of the present invention there is provided a process for printing an image onto a substrate comprising applying thereto an ink according to the first aspect of the present invention by means of an ink jet printer and curing the ink, preferably using an electron beam. Printed substrates obtained by this process form a further feature of the present invention.

Preferred substrates are metal, plastic, ceramic, glass, wood, printed circuit boards and plain and coated papers. Preferred applications include printing for home/office use, packaging, labelling and barcodes, particularly wide format graphics, printed circuit board manufacture, wall coverings, decorative laminates and especially food contact inks.

According to a fourth aspect of the present invention there is provided an ink jet printer cartridge comprising a chamber and an ink wherein the ink is present in the chamber and is as defined in the first aspect of the invention.

The invention in further illustrated by the following examples in which all parts and percentages are by weight unless otherwise stated.

EXAMPLE 1

A particle beam curable ink may be prepared containing the following components as indicated in the columns of Table 1:

TABLE 1

| Component | Weight (g) | Type |
| --- | --- | --- |
| Sartomer ™ SR256 | 10.02 | Monoacrylate |
| Sartomer ™ SR238 | 10.02 | Diacrylate |
| Sartomer ™ SR351 | 40.07 | Triacrylate |
| Regal ™ 250R | 1.75 | Pigment |
| Solsperse ™ 32,000 | 1.09 | Dispersant |
| Solsperse ™ 5,000 | 0.06 | Dispersant |

Sartomer™ is a tradename of (meth)acrylate compounds available from Cray Valley. Sartomer™ SR256 is 2-(ethoxyethoxy) ethyl acrylate. Sartomer™ SR238 is 1,6 hexanediol diacrylate. Sartomer™SR351 is trimethylolpropane triacrylate. Regal™ 250R is a carbon black available from Cabot. Solsperse™ 32,000 is a pigment dispersant available from Lubrizol. Solsperse™ 5,000 is a dispersant synergist available from Lubrizol.

A suitable procedure for the preparation of the above ink is as follows:

A millbase may be prepared by bead milling Regal™ 250R pigment with a small amount of Sartomer™ SR256 and Sartomer™ SR238 together with Solsperse™ 32,000 and 5,000 dispersants until a fine particle dispersion is formed. The remaining components may then be added in the dark and the mixture may be homogenised and then filtered through a 1 micron Whatman™ syringe filter.

The percentages of mono acrylate (16.7%), di acrylate (16.7%) and tri acrylate (66.6%) compounds by weight relative to the total weight of such compounds (100%) are such that the value of Formula (1) is (16.7+0.628×(16.7/sin 60°+ 66.6/tan 60°)=52.93.

Further inks of the present invention may be prepared (in an analogous manner to Example 1) containing the components in the columns of Table 2:

TABLE 2

| Component | | Yellow % | Magenta % | Cyan % | Black % |
| --- | --- | --- | --- | --- | --- |
| Sartomer ™ 506 | Isobornyl acrylate | 8.73 | 8.18 | 8.58 | 8.57 |
| Sartomer ™ SR238 | 1,6 hexanediol diacrylate | 22.48 | 30.84 | 25.42 | 22.74 |

TABLE 2-continued

| Component | | Yellow % | Magenta % | Cyan % | Black % |
|---|---|---|---|---|---|
| Sartomer ™ SR306 | tripropyleneglycol diacrylate | 3.7 | 5.95 | 2.97 | 4.18 |
| Sartomer ™ SR351 | trimethylolpropane triacrylate | 34.9 | 24.53 | 32.54 | 33.48 |
| Sartomer ™ SR454 | Ethoxylated trimethylolpropane triacrylate | 17.45 | 12.26 | 16.28 | 16.74 |
| Tego ™ rad 2100 | ST modifier (silicone acrylate) | 0.15 | 0.15 | 0.15 | 0.15 |
| Paliotol ™ Yellow D1819 | Pigment | 2 | 0 | 0 | 0 |
| Hostaperm ™ Red E5B02 | Pigment | 0 | 5 | 0 | 0 |
| Irgalite ™ Blue GLVO | Pigment | 0 | 0 | 2.5 | 0 |
| Regal ™ 250 | Pigment | 0 | 0 | 0 | 2.5 |
| Solsperse ™ 32,000 | Dispersant | 0.6 | 3 | 1.5 | 1.56 |
| Solsperse ™ 5,000 | Dispersant | 0 | 0.1 | 0.05 | 0.09 |

Paliotol ™ Yellow D1819 is a yellow pigment available from BASF.
Hostaperm ™ red E5B02 is a magenta pigment available from Clariant.
Irgalite ™ blue GLVO is a cyan pigment available from Ciba.
Tego ™ rad 2100 is a surface tension modifier available from Tego.

The invention claimed is:

1. A non-aqueous, substantially solvent-free and photoinitiator-free, particle beam curable ink having a viscosity less than 30 mPa·s at 60° C., comprising:
   (i) a colorant; and
   (ii) a mixture of (meth)acrylate compounds;
   wherein:
   (a) the colorant is present in the ink in an amount of 0.1 to 14.9% by weight relative to the total weight of ink; and
   (b) the mixture of (meth)acrylate compounds comprises c % of one or more mono (meth)acrylate compounds, the mono (meth)acrylate compounds being selected from the group consisting of cyclic trimethylolpropane formal (meth)acrylate, ethoxylated tetra hydrofurfuryl (meth)acrylate, phenoxy ethyl (meth)acrylate, trimethylol propane formal (meth)acrylate, lauryl (meth)acrylate, stearyl (meth)acrylate, monomethoxy neopentyl glycol propoxylate mono (meth)acrylate, monomethoxy tripropylene glycol mono (meth)acrylate, 2-(2-ethoxyethoxy) ethyl (meth)acrylate, iso-decyl (meth)acrylate, iso-octyl (meth)acrylate, iso-nonyl (meth)acrylate, tridecyl (meth)acrylate, iso-bornyl (meth)acrylate, ethoxyl nonyl phenol (meth)acrylate ethoxylated phenol (meth)acrylate, 2-hydroxyl ethyl (meth)acrylate, 4-hydroxyl butyl (meth)acrylate, 2-hydroxy propyl (meth)acrylate, iso-butyl (meth)acrylate, tert-butyl (meth)acrylate, cetyl (meth)acrylate, cyclohexyl (meth)acrylate, ethyl hexyl (meth)acrylate, 2-dimethyl amino ethyl (meth)acrylate, trifluoro ethyl (meth)acrylate, 3-methoxy butyl (meth)acrylate dicyclopentenyl (meth)acrylate, polyethylene glycol mono (meth)acrylate and poly propylene glycol mono (meth) acrylate compounds, d % of one or more di (meth) acrylate compounds and e % of one or more compounds having three or more (meth)acrylate groups, wherein the values of c %, d % and e % are by weight relative to the total weight of the mono (meth)acrylate compounds, di (meth)acrylate compounds and compounds having three or more (meth)acrylate groups and are such that the value of Formula (1) is from 49 to 55.8:

$$c\% + 0.628\left(\frac{d\%}{\sin 60} + \frac{e\%}{\tan 60}\right) \quad \text{Formula (1)}$$

$$c\% + 0.628\left(\frac{d\%}{\sin 60°} + \frac{e\%}{\tan 60°}\right).$$

2. An ink according to claim 1 wherein the colorant is a pigment.

3. An ink according to claim 1 wherein the mono (meth) acrylate compounds and di (meth)acrylate compounds are monomers.

4. An ink according to claim 1 wherein the one or more mono (meth)acrylate compounds is or comprises isobornyl acrylate.

5. An ink according to claim 1 wherein the one or more di (meth)acrylate compounds is or comprises 1,6-hexanediol diacrylate.

6. An ink according to claim 1 wherein the one or more compound comprising three or more (meth)acrylate groups is or comprises trimethylol propane triacrylate and/or ethoxylated trimethylolpropane triacrylate.

7. An ink according to claim 1 wherein the colorant is present in an amount of 1.1 to 8% by weight, relative to the total weight of the ink.

8. An ink according to claim 1 comprising:
   (i) a yellow, magenta, cyan, black, blue, indigo, violet, green, orange or red pigment or a mixture comprising two or more thereof; and
   (ii) a mixture of (meth)acrylate compounds;
   wherein:
   (a) the pigment is present in the ink an amount of from 1.1 to 8% by weight relative to the total weight of ink;
   (b) the mixture of (meth)acrylate compounds comprises c % of one or more mono (meth)acrylate compounds, d % of one or more di (meth)acrylate compounds and e % of one or more compounds having three or more (meth) acrylate groups, wherein the values of c %, d % and e % are by weight relative to the total weight of the mono (meth)acrylate compounds, di (meth)acrylate compounds and compounds having three or more (meth)acrylate groups and are such that the value of Formula (1) is from 49 to 55.8:

$$c\ \% + 0.628\left(\frac{d\ \%}{\sin 60} + \frac{e\ \%}{\tan 60}\right) \quad \text{Formula (1)}$$

$$c\ \% + 0.628\left(\frac{d\ \%}{\sin 60°} + \frac{e\ \%}{\tan 60°}\right)$$

(c) the one or more mono (meth)acrylate compounds are selected from the group consisting of cyclic trimethylolpropane formal (meth)acrylate, ethoxylated tetra hydrofurfuryl (meth)acrylate, phenoxy ethyl (meth)acrylate, trimethylol propane formal (moth)acrylate, lauryl (meth)acrylate, stearyl (meth)acrylate, monomethoxy neopentyl glycol propoxylate mono (meth)acrylate, monomethoxy tripropylene glycol mono (meth)acrylate, 2-(2-ethoxyethoxy) ethyl (meth)acrylate, iso-decyl (meth)acrylate, iso-octyl (meth)acrylate, iso-nonyl (meth)acrylate, tridecyl (meth)acrylate, iso-bornyl (meth)acrylate, ethoxyl nonyl phenol (meth)acrylate, ethoxylated phenol (meth)acrylate, 2-hydroxyl ethyl (moth) acrylate, 4-hydroxyl butyl (meth) acrylate, 2-hydroxy propyl (moth) acrylate, iso-butyl (moth) acrylate, tort-butyl (moth) acrylate, cetyl (meth)acrylate, cyclohexyl (meth)acrylate, ethyl hexyl (meth)acrylate, 2-dimethyl amino ethyl (meth)acrylate, trifluoro ethyl (meth)acrylate, 3-methoxy butyl (meth)acrylate, dicyclopentenyl (meth)acrylate, polyethylene glycol mono (meth)acrylate and poly propylene glycol mono (meth)acrylate and mixtures thereof;

(d) the one or more di (meth)acrylate compounds are selected from the group consisting of di(meth)acrylates of 1,4 butane diol, 1-6 hexane diol, neopentyl glycol, mono, di, tri and poly ethylene glycols, mono, di, tri and poly propylene glycols, mono methoxy ethoxylated trimethylolpropane, propoxylated neopentyl glycol, ethoxylated neopentyl glycol, 1,2 butylene glycol and ethoxylated hexane diol and mixtures thereof; and (e) the one or more compounds having three or more (meth)acrylate groups are selected from the group consisting of trimethylol propane tri(meth)acrylate, ethoxylated trimethylol propane tri(meth)acrylate, propoxylated trimethylol propane tri(meth)acrylate, glycerol tri(meth)acrylate, propoxylated glycerol tri(meth)acrylate, pentaerythritol tri(meth)acrylate, pentaerythritol tetra(meth)acrylate, tris (2-hydroxyethyl) isocyanurate triacrylate, ditrimethylol propane tetra (meth)acrylate, ethoxylated pentaerythritol tetra (meth)acrylate, ethoxylated di-pentaerylthritol tetra (meth)acrylate, tetra methylol methane tetra (meth)acrylate, multifunctional (meth)acrylate-urethanes, (meth)acrylate-polyesters and (meth)acrylate acrylics and mixtures thereof.

9. An ink according to claim 1 which has been filtered through a filter having a mean pore size of less than 10 μm.

10. A process for printing an image onto a substrate comprising printing an image onto a substrate using an ink according to claim 1 by means of an ink jet printer and curing the ink.

11. A process according to claim 10 wherein the curing is performed using an electron beam.

12. A printed substrate obtained by the process of claim 10 or 11.

13. An ink jet printer cartridge comprising a chamber and an ink wherein the ink is present in the chamber and is as defined in claim 1.

14. A substrate printed with an image using an ink according to claim 1.

* * * * *

UNITED STATES PATENT AND TRADEMARK OFFICE
CERTIFICATE OF CORRECTION

PATENT NO. : 7,700,263 B2 Page 1 of 1
APPLICATION NO. : 10/583709
DATED : April 20, 2010
INVENTOR(S) : Andrew Stuart Overend et al.

It is certified that error appears in the above-identified patent and that said Letters Patent is hereby corrected as shown below:

Col. 2, line 16, delete the duplicated formula " $c\% + 0.628\left(\dfrac{d\%}{\sin 60°} + \dfrac{e\%}{\tan 60°}\right)$ "

Col. 6, line 56, delete the duplicated formula " $c\% + 0.628\left(\dfrac{d\%}{\sin 60°} + \dfrac{e\%}{\tan 60°}\right)$ "

Claim 1, Col. 10, line 31, delete the duplicated formula " $c\% + 0.628\left(\dfrac{d\%}{\sin 60°} + \dfrac{e\%}{\tan 60°}\right)$ "

Claim 8, Col. 11, line 10, delete the duplicated formula " $c\% + 0.628\left(\dfrac{d\%}{\sin 60°} + \dfrac{e\%}{\tan 60°}\right)$ "

Signed and Sealed this

Twenty-second Day of June, 2010

David J. Kappos
*Director of the United States Patent and Trademark Office*